United States Patent [19]

Welsch

[11] Patent Number: 4,744,023

[45] Date of Patent: May 10, 1988

[54] PROCESSOR ACCESS CONTROL ARRANGEMENT IN A MULTIPROCESSOR SYSTEM

[75] Inventor: Lawrence A. Welsch, Naperville, Ill.

[73] Assignee: American Telephone and Telegraph Company, AT&T Information Systems, Holmdel, N.J.

[21] Appl. No.: 808,951

[22] Filed: Dec. 16, 1985

[51] Int. Cl.⁴ ............................................. G06F 15/16
[52] U.S. Cl. ...................................................... 364/200
[58] Field of Search ......................... 364/200 MS File

[56] References Cited

U.S. PATENT DOCUMENTS

| | | | |
|---|---|---|---|
| 4,373,183 | 2/1983 | Means et al. | 364/200 |
| 4,384,323 | 5/1985 | Ahuja | 364/200 |
| 4,493,021 | 1/1985 | Agrawal et al. | 364/200 |
| 4,514,728 | 4/1985 | Ahuja | 340/825.5 |
| 4,543,627 | 9/1985 | Schwab | 364/200 |
| 4,546,430 | 10/1985 | Moore et al. | 364/200 |

OTHER PUBLICATIONS

S. R. Ahuja, "S/NET: A High-Speed Interconnect for Multiple Computers," *IEEE Journal on Selected Areas in Communications*, vol. SAC-1, No. 5, Nov. 1983, pp. 751-755.

K. A. Elmquist, H. Fullmer, D. B. Gustavson and G. Morrow "Standard Specification for S-100 Bus Interface Devices", *Computer*, vol. 12, No. 7, Jul. 1979, pp. 28-52.

*Primary Examiner*—Raulfe B. Zache
*Attorney, Agent, or Firm*—Peter Visserman

[57] ABSTRACT

In a multiprocessor system, processors are connected to an interconnecting bus by means of bus interface circuits which comprise an address buffer in addition to data buffers. The interconnecting bus, in addition to a destination address and data also carries an originating address identifying the processor transmitting the data. In the event of a receive buffer overload condition in the receiving bus interface circuit, a negative acknowledge signal is transmitted on the bus and the originating address is queued in the address buffer. When the buffer overflow condition has been relieved, a retransmission request is sent to the first processor identified in the address buffer and its message is received. This procedure will be repeated for each processor identified in the address buffer.

13 Claims, 3 Drawing Sheets

PROCESSOR ACCESS CONTROL ARRANGEMENT IN A MULTIPROCESSOR SYSTEM

TECHNICAL FIELD

This invention relates to multiprocessor systems and, more particularly, to an arrangement for controlling access to the processors of a multiprocessor system.

BACKGROUND OF THE INVENTION

A multiprocessor system commonly consists of a plurality of interconnected processors which cooperate to perform data handling jobs. Consequently, a large number of data messages are interchanged between the processors on a regular basis. It has long been recognized that this interprocessor communication can become a bottleneck which robs the system of computing time and diminishes its capacity for handling computing jobs. Customarily, data transfers between two processors are initiated by the processor preparing to transmit a data message. The transmitting processor first requests access to a common bus interconnecting the system processors, and, after having been granted bus access, transmits the message on the bus together with the identity of the intended receiving processor. Much effort has been devoted to resolving bus access problems, and a number of technical solutions are known for handling bus access requests on a priority basis while minimizing access delays resulting from conflicting access demands. Some bus access arrangements assure "fair" access to a bus in that, while providing access on a priority basis, a low priority processor is not allowed to be excluded for an inordinately long period of time. The prior art, however, has not successfully addressed the problem of fair access to a receiving processor after access to the bus has been obtained by a message transmitting processor. A transmitting processor of a multiprocessing system, after having waited for access to the bus, may find that the receiving processor is unable to accept a data message. In prior art systems the transmitting processor must then try again to gain access to the bus and may be denied access to the receiving processor again. When this happens often, a particular processor may be prevented from performing its tasks for an inordinate length of time and potentially forever. This repeated denial of access is a burden to the system and reduces the system's data handling capacity.

It is an object of this invention to provide "fair" access to a receiving processor from the other processors of a multiprocessor system.

SUMMARY OF THE INVENTION

In accordance with this invention, data communication between processors of a multiprocessor system is improved by recording the identity of a data transmitting processor which has been denied access to a data receiving processor and by granting the denied processor access to the receiving processor before other processors. In accordance with one aspect of the invention, the identity of each processor which is denied data transfer access to an intended receiving processor is recorded in an address buffer in the sequence in which data transfer access attempts are made. When the receiving processor is available to receive additional data messages, a request for retransmission is sent to the first processors identified in the address buffer. Upon completion of receipt of a data message from the denied processor, a message requesting retransmission is sent to other processors identified by the addresses in the buffer in the sequence in which they are stored.

Advantageously, this arrangement may be used in multiprocessor systems employing a single interconnecting bus to which access is granted on a priority basis to provide an interprocessor arrangement wherein processors gaining access to the bus are assured data transfer access to an intended receiving processor within a reasonable period of time.

In one specific embodiment of the invention, the processors of a multiprocessor system are interconnected by means of a bus to which access is granted on a priority basis. When data is transferred by one of the processors connected to the bus, it is accompanied by an originating address as well as a destination address. Each processor of the multiprocessor system has an associated receive buffer which receives data from the bus and which is emptied by the processor, as well as an address buffer for storing in sequence the identity of each processor which has been denied data transfer access by the intended receiving processor. When the receive buffer is full, or an entry is present in the address buffer of the intended receiver, no further data messages will be accepted. Under those circumstances, a negative acknowledge is sent to each processor from which a message could not be accepted and the address of each such processor is entered in the address buffer. When the receive buffer becomes empty while the identity of a denied processor remains in the address buffer, the intended receiver of the original message will request access to the bus and upon being granted access will seize the bus. A message requesting retransmission will be sent via the seized bus to the processor identified by the earliest unserved entry in the address buffer. The processor receiving the message then transmits the data over the seized bus.

Advantageously, in a system in accordance with this invention, the data processing capability of a multiprocessor system is increased significantly. Calculations show that in a system having 10 or more processors handling tasks requiring two or more processors, the arrangement of this invention will provide approximately 20 per cent improvement in the data handling capability of the system.

BRIEF DESCRIPTION OF THE DRAWING

The invention may be better understood from the following description when read in conjunction with the drawing in which.

DETAILED DESCRIPTION

Figure 1:
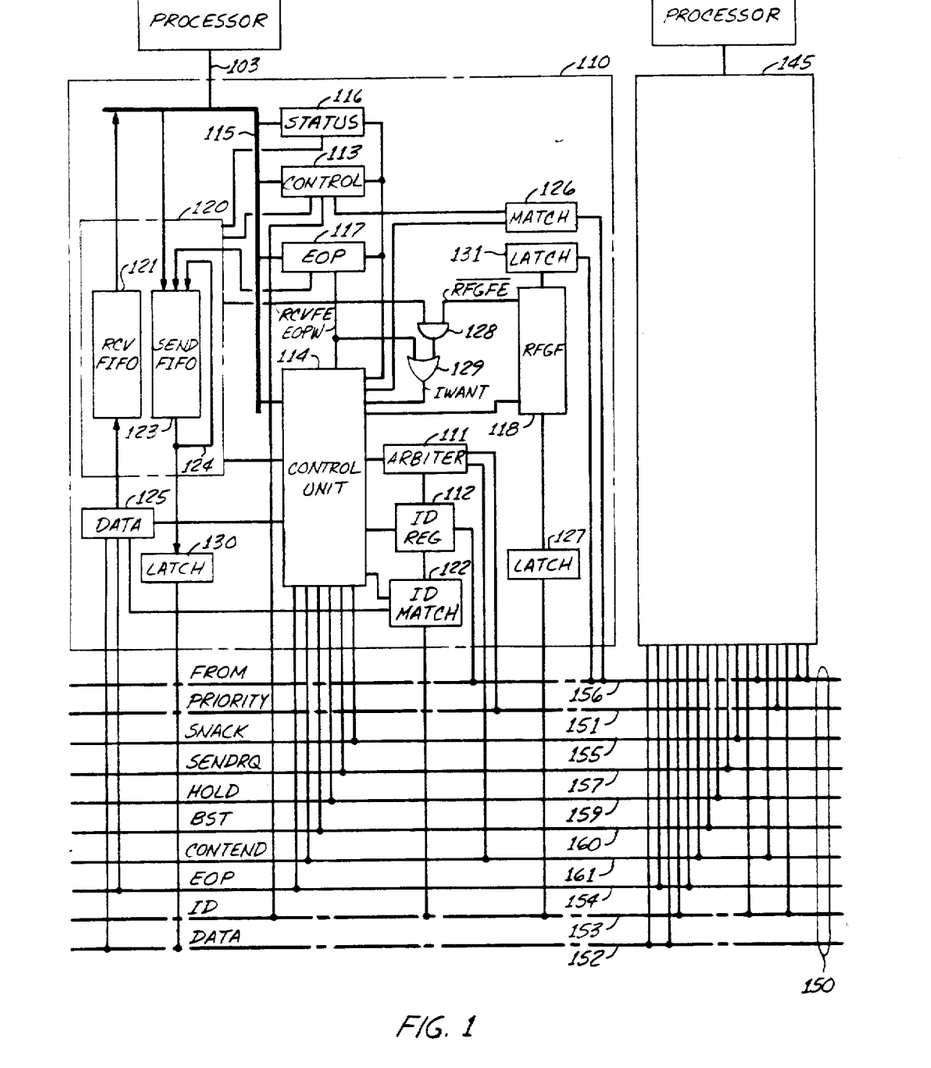
FIGS. 1 and 2 represent a multiprocessor system showing the access control arrangement of the invention in block diagram form.
Figure 2:
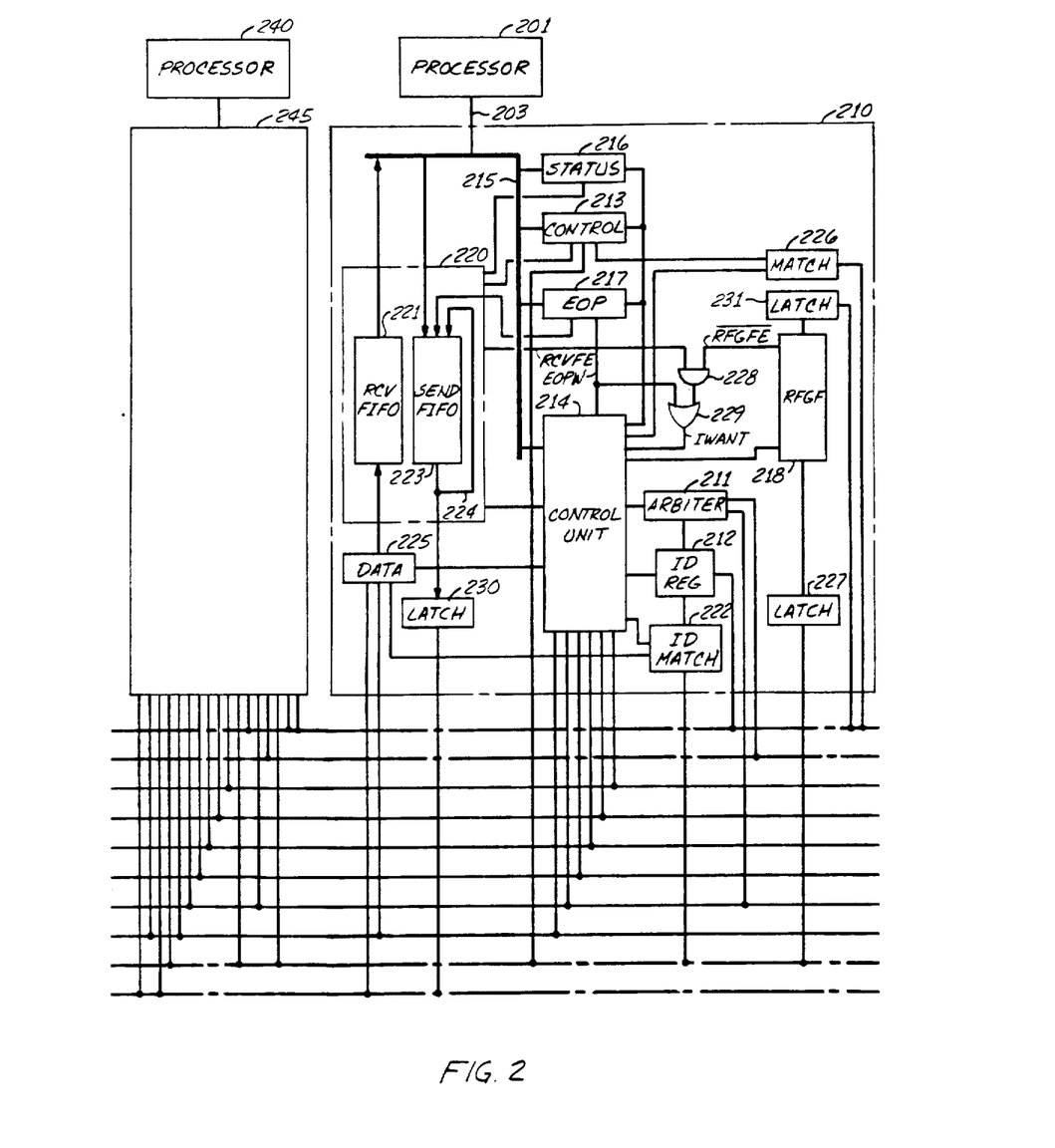

FIG. 1 shows processors 101 and 140 connected by means of a bus interface circuits 110 and 145, respectively, to an interprocessor bus 150. FIG. 2 shows a corresponding arrangement in which processors 201 and 240 are connected to bus 150 by means of processor interface circuits 210 and 245, respectively. To illustrate the principles of this invention only four processors and the corresponding interconnecting circuitry are shown connected to the bus 150. A larger number of processors, for example, more than 10, may be connected to the bus using bus interface circuits as described herein to interface each of the processors with the interconnecting bus. The processors 101, 201, and other processors may, for example, be any number of different processor systems such as a WE ® 32100 single board computer, or a Motorola ® 68,000 single board computer or an AT&T Company 3B5 computer or other processors capable of communicating with the bus 150 through circuitry such as the bus interface circuits described herein.

Interface circuits 110, 145, 245 and 210 are assumed to be identical. Each of the blocks of the interface 110 as shown in FIG. 1 will be described with the understanding that correspondingly named blocks in interface circuit 210 shown in FIG. 2 are identical and perform corresponding functions. Interface circuit 110 comprises a data buffer unit 120 which consists of a receive FIFO 121 and a send FIFO 123. The interface circuit 110 also comprises a control unit 114 and a control register 113, a status register 116 and an end-of-packet (EOP) register 117. These units are involved in communications between the processor 101 and the interface circuit 110. The processor 101 has write access to send FIFO 123, control register 113 and EOP register 117, and has read access to status register 116 and receive FIFO 121. These units such as the FIFOs and the three registers may be in the address space of the processor and addressed via its memory address bus. In that event, the processor bus 103 shown in FIG. 1 is simply an extension of the memory bus of processor 101. Alternative bus arrangements, for example, using the processor peripheral bus, can be readily devised as well. The control unit 114 will receive a read or write strobe from the processor 101 via connection to bus 115, when (a) the receive FIFO 121 or send FIFO 123, or (b) status register 116, or (c) control register 113, or (d) EOP register 117 is addressed. The control unit examines two preselected bits of the address to select one of these four addressable entities and controls access from the processor 101 to the addressed units in a standard well-known fashion. Finite state machines or similar logic may be used to implement separate control of the read and write access to the FIFOs and the status, control and EOP registers. The circuitry and logic for accomplishing these operations are well known in the art and are not described in detail herein. The control units 114, 214 comprise the necessary decoders to decode address information, and Field Programmable Logic Arrays (FPLAs) and Field Programmable Logic Shift Registers (FPLSs) to implement finite state machines. All of these devices are commercially available and their use to accomplish the desired functions are well known.

When the processor 101 wishes to send a data packet to another processor, it writes the data words of the packet to the send FIFO 123, also referred to as send buffer herein. The last word of the packet it transmits to the EOP register 117 indicating end of packet. The data words in this illustrative system consists of 32 bits, and the send buffer, as well as the receive buffer is 32 bits wide. A well-known data latch 130 is provided between the send buffer and the bus to compensate for timing differences between the buffer and the bus. The EOP register 117 and send buffer 123, however, are 33 bits wide and the contents of the EOP register is transferred to the send buffer 123 with an extra bit indicating end of packet. The EOP register 117 also generates an EOPW output signal indicating that end of packet has been written. This signal signifies to the control unit 114 that the last word of a packet has been received. Further, the EOPW signal is transmitted through OR gate 129 to control unit 114 to initiate contention for the interconnecting bus 150. With the transmission of a data packet to the send FIFO 123, the processor 101 also transmits a 7-bit identity code to the control register 113. This is the identity or address of the processor to which the packet is to be transmitted. Once access has been gained to the bus 150, the contents of the control register 113 is placed on bus 150 as a destination address together with data words obtained from send FIFO 123, and an origination address obtained from I.D. register 112. This last-named register contains the 7-bit identity code for bus interface circuit 110. Data words are transmitted on the 32-bit DATA bus 152, the destination address is transmitted on the 7-bit I.D. bus 153 and the origination address is transmitted on the 7-bit FROM bus 156, all of which are part of bus 150.

When another processor, for example, processor 201 transfers data words to processor 101, they are stored in receive FIFO 121 which is also referred to as receive buffer 121. The last word of the packet will be accompanied by a signal on the EOP lead 154 of the bus 150 which is stored in the receive FIFO 121 with the last word of the packet. The processor 101 will read the data from the receive FIFO 121 and when the last word of the packet is read, the control unit 114 will make a corresponding entry in the status register 116. Until the processor 101 reads the status register, the control unit 114 will inhibit a further reading of the receive buffer until the processor 101 reads the status register.

As shown in FIGS. 1 and 2, the interconnecting bus 150 comprises a multiple bit priority bus 151 to which an arbiter circuit is connected in each interface circuit 110, 210 and in other interface circuits that may be connected to the bus. Bus arbitration may be accomplished by any of a number of well-known bus arbitration schemes which grant bus access on a priority basis. One well-known bus arrangement is the standardized S-100 bus for which an arbitration protocol has been defined. The arbiter circuits 111, 211 may be a well-known arbiter circuit such as that defined for the S-100 bus, or a similar circuit which will select from a number of contenders and provide a grant signal to the highest priority contender. The priority bus 151 is a 7-bit bus having seven priority leads. Such an arrangement can be theoretically be used to define as many as 127 different priorities for 127 different processors using the S-100 arbiter circuit. The arbiters 111, 211, and those in other interface circuits such as interface 140, 240 are connected to all seven leads of the priority bus. The arbiter 111 receives a unique seven bit identification word from I.D. register 112. This identification word defines the identity of the processor 101 and bus interface circuit 110 as well as priority for purposes of bus access. The arbiter, through the use of open collector logic gates or the like, holds certain of the priority leads to a predefined logic state (e.g. logical zero) so as to define the priority of the associated processor 101. Only if there is no processor of a higher priority defined by the state of the priority leads will the arbiter 111 provide an appropriate grant signal to the control unit 114 granting access to the data bus 152.

The control unit of each bus interface circuit comprises a finite state machine to control the reading or receiving of data from the bus and a finite state machine to control the writing or sending of data to the bus. A sending processor, for example processor 201, through its bus interface circuit 210 obtains access to the data bus 152 and transmits data together with the identity of the receiving processor, for example, processor 101 and the identity of the originating processor 201. In bus interface circuit 101, an I.D. match circuit 122 monitors the I.D. bus 153 and compares it with the address defined in I.D. register 112. When the address of process 101 is recognized, data latch 125 is enabled by a match signal from the match circuit 122 and an enable signal from control unit 114 to transfer data from the bus to the receive buffer 121.

Figures 3, 4, 5:
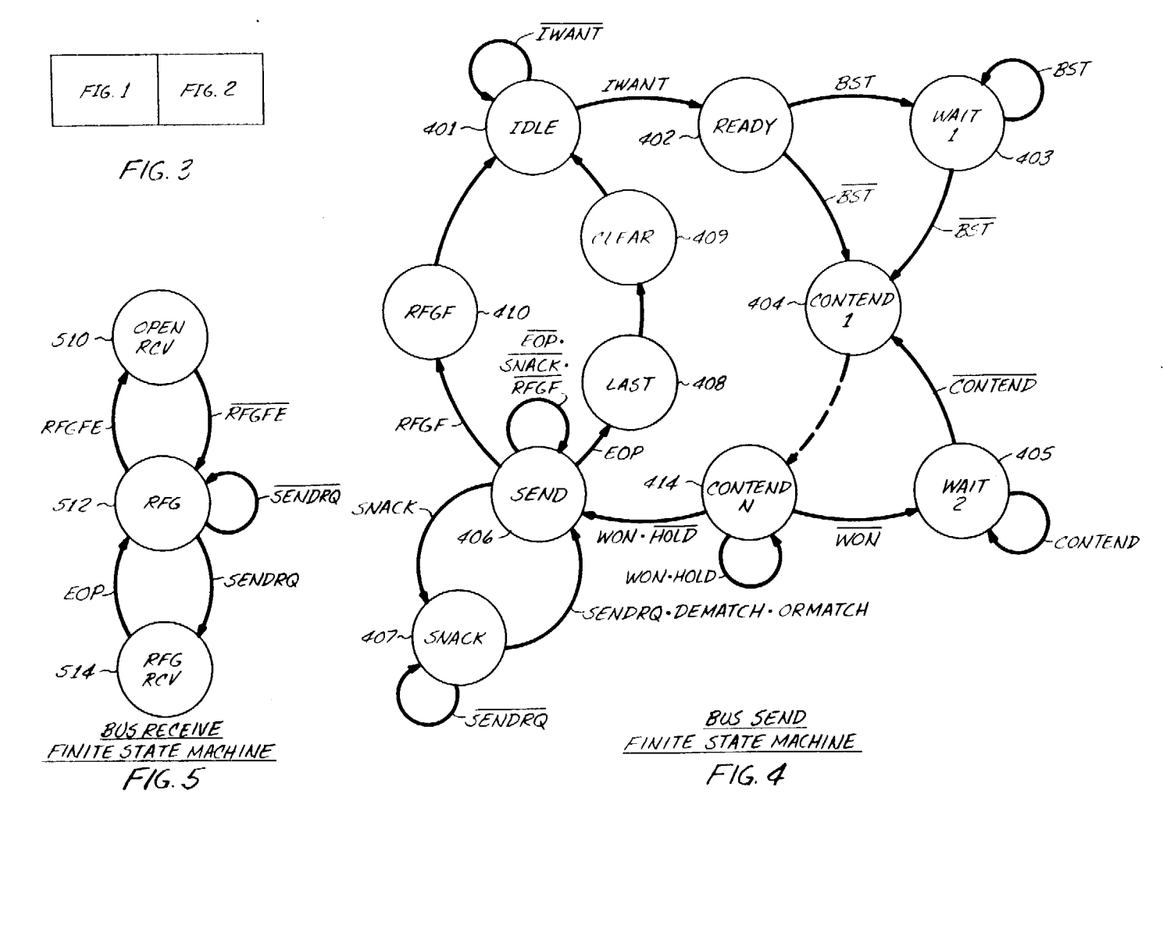
FIG. 3 is a composite showing the arrangement of FIGS. 1 and 2.
FIGS. 4 and 5 are flow diagram representations of finite state machines incorporated in the access control arrangement of FIGS. 1 and 2.

FIG. 5 shows the states of the finite state machine for controlling the bus receive operation, as embodied in the control units (114, 214) of each of the bus interface circuits connected to the bus 150. Its operation will be described only with respect to bus interface circuit 110 and is analogous in interface circuit 210 and others. The initial state of the finite state machine is the open receive state 510. In this state, an enable signal is provided to the data latch 125 and data transfer from the bus to the receive FIFO 121 takes place as long as the address on I.D. bus 153 matches the content of the I.D. register 112. Under conditions other than buffer overflow, there is no need to change from the open receive state. FIFOs 121 and 123 are standard commercially available FIFOs which provide the customary "buffer full" and "buffer empty" indications and a receive buffer full condition before the receipt of an end-of-packet signal is interpreted as an overflow condition. The control unit 114 monitors the "buffer full" and "buffer empty" indications for the receive buffer 121 and the EOP lead 154 of bus 150 in the OPEN RECEIVE state 510. In normal operations, the processor 101 will read data words from the receive FIFO 121 at a slower rate than the transfer rate of the data bus 152, thus accounting for a possible receive buffer overflow condition even in the absence of abnormal conditions in the processor 101. In the drawing the leads which provide buffer level status signals to the control unit 114, are for the sake of simplicity, shown as an output from the buffer unit 120. Control unit 114 also makes the appropriate entries in the status register 116 reflecting the states of these buffer indicators. The occurrence of a receive buffer full indication before the EOP signal for an associated packet has been received on the EOP lead 154 indicates that nothing or only part of a packet has been successfully stored in the receive buffer. In that case, while the finite state machine remains in the open receive state, a negative acknowledge signal SNACK is transmitted by control unit 114 over the SNACK lead 155 of bus 150. This SNACK signal will be received by the data sending circuit, e.g. 210.

Each of the bus interface units comprise a FIFO labeled RFGF. This is shown in block 118 in FIG. 1 and in block 218 in FIG. 2. The RFGF FIFO, like the other FIFOs used in the system is a standard commercially available device which generates the standard "buffer full", "buffer empty", condition signals. Data latches (127, 227, 131, 231) are provided to compensate for timing difference between the FIFO and the bus. In this illustrative system, a processor transmitting a data packet sends a destination address on I.D. bus 153 and an origination address, identifying the sending processor, on the FROM bus 156. Upon detection of a receive buffer overflow condition, as indicated by the receive buffer full indication, the control unit 114 enables the RFGF FIFO 118 to store the originating address occurring on the FROM bus 156. Referring to FIG. 5, the storing of the contents of the FROM bus in the FIFO as well as the transmission of the SNACK signal occur in the OPEN RECEIVE state 510. Upon completion of this action, a transition is made to the RFG state 512 on the condition that the RFGF buffer is not empty. In the RFG state 512, the control unit 114 will continue to monitor the receive buffer status leads as well as the output of the match circuit 122. When the match circuit 122 indicates the occurrence of the I.D. of processor 101 on the I.D. bus 153 while in state 512, the control unit 114 will again enable the RFGF FIFO 118 to store the origination address occurring on the FROM bus 156 and transmit the SNACK signal. This will take place as many times as other processors attempt to transfer data to processor 101 while the bus receive finite state machine remains in the RFGF state 512.

When the receive FIFO 121 becomes empty and the RFGF FIFO 118 is not empty, AND gate 128 will be activated and its output transmitted through OR gate 129 to generate an IWANT signal. This signal is transmitted from controller 114 to the arbiter 111 to cause it to begin contending for access to the bus at the earliest opportunity in order to allow controller 114 to send a retransmission request to the first processor identified in the RFGF buffer. In this illustrative system, the arbiters are arranged to provide a fair access to the bus in such a manner that all arbiters contending for the bus in any one bus cycle will be served before arbiters activated in subsequent bus cycles are allowed to seize the bus. An arrangement for implementing such a bus allocation scheme is disclosed in U.S. Pat. No. 4,514,728, entitled "Store Group Bus Allocation System". For the purposes of illustrating the present invention, any standard arbitration scheme could be employed. Using the so-called fair access scheme, a group of interface circuits in contention for the bus will assert the BST lead 160 of bus 150. This may last several bus cycles and other circuits will not attempt to contend for the bus as long as the BST lead is asserted. When a bus interface circuit is in the contention process, it will assert the CONTEND lead 161 and when the bus is seized the HOLD lead 159 is asserted.

The control units 114 and 214 both embody the bus send finite state machine depicted in FIG. 4 as well as the bus receive finite state machine of FIG. 5. The sequence shown in FIG. 4 is used to transfer data from the send buffer 123, 223 to the bus. It is also used to control the sending of the retransmit request to a processor e.g., processor 201, which was denied data transfer access to another, e.g., processor 101. The sending of this message from processor 101 will be described. Similar actions will take place in other bus interface circuits under similar conditions. Upon the generation of the IWANT signal at the output of OR gate 129, referred to above, the finite state machine moves from its IDLE state 401 to the READY state 402. This last named state is used as a synchronization state since the IWANT signal is not synchronized to the timing of control unit 114 which is synchronized with the bus 150. If the BST lead is asserted, indicating that one or more other arbiters are contending for the bus, a transition will be made from the READY state 402 to the WAIT-1 state 403. If the BST lead is not asserted when the finite state machine is in the READY state 402 or in the WAIT-1 state 403, a transition will be made to the CONTEND-1 state 404.

The arbiters 111, 211 and others connected to the bus determine priority by applying their identity to the priority bus 151 and by withdrawing when the I.D. of a higher priority arbiter is on the priority bus 151. In such an arrangement, depending upon the electrical delays of the physical circuitry, it may take more than one bus cycle, possibly three to five bus cycles, to resolve the contention for the bus. In FIG. 4 this is represented by a dotted line between the CONTEND-1 state 404 and the CONTEND-N state 414. The actual number of CONTEND states is a matter of design choice dependent on the physical parameters of the system. In any event, if the arbiter 111 has not transmitted a WON signal to the control unit 114 indicating access has been granted, by the time normally required for resolving contention on the bus, a transition will be made to the WAIT-2 state 405. The control unit 114 will monitor the CONTEND lead 161 of the bus 150, and when this lead is no longer asserted, a transition will be made from the WAIT-2 state 405 to the CONTEND-1 state 404. The sequencing through the CONTEND states and the WAIT-2 state will be repeated until arbiter 111 provides a WON signal to control unit 114. Control unit 114 will also monitor the HOLD lead 159 of the bus 150. This lead is asserted by a bus interface circuit which has obtained access to the bus and is sending data. As long as the HOLD lead remains asserted after the WON signal has been received, the bus send finite state machine will remain in the CONTEND-N state 414. When the HOLD lead 159 is relinquished, a transition will be made to the SEND state 406. In this state, control unit 114 will assert the HOLD lead 159 of bus 150 indicating seizure of the bus.

In the illustrative example referred to earlier, data was transferred from processor 201 to processor 101 and a buffer overflow was encountered. As a consequence, the address of processor 201 would have been stored in the RFGF buffer 118, and the buffer would have supplied the RFGF signal to the control unit indicating the non-empty state of the buffer. Under those conditions, a transition will be made from the SEND state 406 to the RFGF state 410. In this state, control unit 114 will enable the RFGF buffer 118 to transmit the first address in the FIFO via data latch 127 to the I.D. bus 153, and delete that entry from the FIFO. Concomitantly, control unit 114 will send a retransmission request by asserting the SENDRQ lead 157 of bus 150. Assertion of this lead will be recognized as a retransmission request by the other processor interface circuit, e.g., 214. After one cycle in state 410 a transition will be made to the IDLE state 401 and the HOLD lead 159 will no longer be asserted. As will be seen from the subsequent description, bus seizure by controller 114 will be assumed by the controller (e.g. 214) receiving the retransmission request. Thus, the processor which was denied earlier access to interface circuit 110 does not separately have to contend for bus access after receiving a retransmission request.

Control unit 214 of bus interface circuit 210, shown in FIG. 2 contains a finite state machines identical to those of control unit 114. In the illustrative example referred to earlier herein processor 201 sent a data message to processor 101. A buffer overflow condition was encountered in interface circuit 110, and a negative acknowledge signal SNACK was transmitted to interface circuit 210 on lead 155 of bus 150. In sending the original data message from processor 201, the associated interface control unit 214 will have progressed from the IDLE state 401 to the SEND state 406 of the bus SEND finite state machine depicted in FIG. 4. The transition from the IDLE state is caused by the IWANT signal generated at OR gate 229. When data is to be sent from processor 201 to processor 101, a data packet is stored in send FIFO 223 with the last word of the packet being transferred to EOP register 217. The EOP register will provide an end-of-packet signal EOPW to OR gate 229 causing the IWANT signal to be generated. In response to the IWANT signal the bus send finite state machine of control 214, as depicted in FIG. 4, will move from the IDLE state 401 to the READY state 402 and through the CONTEND states to the SEND state 406. This action is the same as described earlier with respect to FIG. 4 and the bus contention and bus seizing action of control unit 114.

The control unit 214 will transfer data words from the send FIFO 223 to the data bus 152 while in the SEND state 406. It will also transmit a destination I.D. on I.D. bus 153 and an origination I.D. on FROM bus 156. The control unit 214 will monitor the SNACK lead 155 of bus 150 and when the data receiving interface circuit (e.g. 110) asserts this lead, the bus send finite state machine will change from the SEND state to the SNACK state 407 and halt the further sending of data from FIFO 223. Normally, a period of time will elapse between the time that the SNACK signal is sent by the receiving bus interface 110 and the time that a retransmission request is initiated. The bus send finite state machine in control unit 214 will remain in state 407 during this time period, until the SENDRQ lead 157 of the bus 150 is asserted from the processor which send the SNACK signal. This SENDRQ signal generated by control unit 114 as described earlier herein, is accompanied by a destination address on I.D. bus 153 obtained from the RFGF buffer 118 and an origination address on FROM bus 156. In the interface circuit 210 the matcher 222 will provide a DEMATCH output signal to data latch 225 and to control unit 214 when the I.D. on bus 153 matches the contents of I.D. register 212 which stores the I.D. of processor 201. Similarly, matcher 226 will compare the address on the FROM bus with the address in the control register 213. It is noted that the control register contains the address of the processor to which the contents of the send buffer were originally transmitted. Thus, this comparison provides a check on the address before a retransmission is initiated. An ORMATCH signal is provided to control unit 213 in case of a match. This information with the assertion of the SENDRQ lead 157 will cause a transition to be made from the SNACK state 407 back to the SEND state 406 in control unit 214. In this state data latch 225 is enabled from control unit 214 and the contents of the send FIFO 223 will be transmitted to data bus 152. When the last word of a packet being transmitted reaches the data bus, it will be accompanied by an EOP bit indicating end-of-packet. This bit is transmitted from data register 225 as a thirty-third bit, the thirty-two bit data word being transmitted on data bus 152 and the EOP bit being transmitted on EOP lead 154. When this EOP bit is detected by control unit 214, a transition is made to the LAST state 408. It will be understood that if a SNACK signal is detected before EOP, a return will be made again to the SNACK state. In the LAST state, the send FIFO 223 and data latch 225 are disabled from control unit 214. From the LAST state a transition is made to the CLEAR state 409 in which the contents are cleared from the send FIFO 223. A connection (124, 224) is provided from the output of the send FIFO to cause the contents of the FIFO to be circulated during the sending operation. This allows a transmitted packet to be saved for retransmission in case a negative acknowledge SNACK signal is received during transmission. When a complete packet has been successfully transmitted, the FIFO is cleared in the CLEAR state. From the CLEAR state a return is made to the IDLE state 401.

In the example described in the preceding paragraphs, processor 201 was denied access to processor 101 in the transmission of a data packet, due to a receive buffer overflow condition in bus interface unit 110. As indicated in the earlier description of the operation of control unit 114 with reference to FIG. 5, the buffer overflow condition results in a transfer from the OPEN RECEIVE state 501 to the RFG state 512 and the identity of the processor sending the packet causing the overflow condition is entered in the RFGF buffer (118, 218). As explained earlier, a retransmission request is transmitted by control unit 114 on the SENDRQ lead 157 when the receive buffer becomes empty and an address is stored in the RFGF buffer. This occurs under control of the bus send finite state machine (FIG. 4) embodied in control unit 114. Meanwhile, the bus receive finite state machine (FIG. 5) in control unit 114 is in the RFG state 512. In this state the data latch 125, which controls the transfer of data from the bus to the receive buffer 121, is disabled. When the SENDRQ lead 157 is asserted by processor 114, a transition is made in the bus receive finite state machine of control unit 114 from the RFG state 512 to the RFG RECEIVE state 514. In this state the data latch 125 is enabled once again from control unit 114 to transmit data from the bus to the receive FIFO 121. Thus, when a packet is retransmitted from the interface circuit 210 together with the appropriate I.D. on bus 153 identifying processor 101, the output of the match circuit 122 when ANDed with the enable from the control unit 114 in register 125, will allow the data register to pass the information occurring on the data bus to the receive FIFO 121. The bus receive finite state machine will remain in the RFG RECEIVE state 514 until the EOP lead 154 is asserted by interface unit 210, as described earlier. When the EOP indication is received by the control unit 114, a transition will be made in the read finite state machine in control unit 114 from the RFG RECEIVE state 514 to the RFG state 512.

As long as there remains the address of at least one processor which has not been served in the RFG FIFO 118, another send request will be originated from the interface circuit 110 in the manner described above and the bus receive finite state machine (FIG. 5) will again make a transition to the RFG RECEIVE state 514 and repeat the sequence of receiving an additional packet and returning to the RFG state 512. When the RFG FIFO 118 is empty, as indicated by the RFGFE signal, a transition will be made to the OPEN RECEIVE state 510. The bus receive finite state machine will remain in this state for normal bus read operations.

As indicated earlier, the interface circuits 110 and 210 are intended to be identical and the description of the function of a block in FIG. 1 will apply equally to a like-named block in FIG. 2, and vice versa. Similarly, the control units 114 and 214 contain identical finite state machines. The bus send finite state machine depicted in FIG. 4 and the bus receive finite state machine depicted in FIG. 5 perform identically in both control units. In the above description, an example was chosen of the sending of a packet from the processor 201 to processor 101 and the operations of the various units of the figures were explained. The example could be reversed, in which case the blocks of FIG. 1 would perform the functions described with respect to like-named blocks of FIG. 2 and the blocks of FIG. 2 would perform the functions described with respect to like-named blocks of FIG. 1. It will be apparent that the above-described arrangement is merely illustrative of the application of the principles of the invention and that numerous other arrangements may be devised by those skilled in the art without departing from the spirit and scope of the invention.

What is claimed is:

1. An arrangement for interconnecting a plurality of processors in a multiprocessor system, comprising an interconnecting bus for transferring origination and destination addresses, data words and control messages, and a plurality of bus interface circuits connected to said bus, said bus interface circuits each having a unique identification address associated therewith, including a bus interface circuit comprising:

a receive buffer for storing data messages accompanying a destination address corresponding to said associated address occurring on said bus and for genernating receive buffer status signals;

an address buffer for storing identification addresses and for generating address buffer status signals;

control means responsive to said receive buffer status signals indicating an overload condition and a destination address corresponding to said associated address occurring on said bus to store an origination address occurring on said bus in said address buffer and responsive to said receive buffer and address buffer status signals for fetching one of said identification addresses from said address buffer and transmitting said one of said identification addresses on said bus together with a retransmission request control message when said receive buffer status signals indicate that said receive buffer is ready to receive additional data words and said address buffer status signals indicate that addresses are present in said address buffer.

2. The interconnecting arrangement in accordance with claim 1 further including another bus interface circuit comprising transmitting means for transmitting data messages and origination and destination address words on a said bus and reponsive to said one of said identification addresses on said bus and said control message occurring on said bus to retransmit a priorly transmitted data message.

3. The interconnection arrangement in accordance with claim 2 wherein said control means is further responsive to said receive buffer status signals indicating an overload condition for transmitting a status control message on said bus, and said transmitting means is responsive to said status control message occurring on said bus to inhibit transmission of data messages on said bus.

4. An interconnection arrangement for interconnecting a plurality of processors comprising a first bus interface circuit and a second bus interface circuit, said bus interface circuits each having a unique address associated therewith, and bus means interconnecting said bus interface circuits;

said first bus interface circuit comprising means for receiving a data message and a destination address and means for transmitting a received data message and destination address on said bus means together with an origination address corresponding to said unique address associated with said first bus interface circuit;

said second bus interface circuit comprising a receive buffer for storing data message and for generating receive buffer status signals, address storage means for storing a plurality of addresses, and means responsive to a destination address on said bus means and said status signals to store said origination address in said address storage means when said status signals indicate nonreadines to receive additional data and further responsive to said status signals to retrieve a selected address from said address storage means and to transmit said selected address and a transmission request message on said bus means when said status signals indicate readiness to receive additional data;

said first bus interface circuit being responsive to said selected address and said request message transmitted on said bus means to retransmit a priorly transmitted message on said bus means.

5. The method of communicating among processors of a multiprocessor system having a data transmitting processor and a data receiving processor, comprising the steps of:
 a. transmitting a data message from said transmitting processor to said receiving processor;
 b. transmitting an access denial message from said receiving processor to said transmitting processor if said data message cannot be received by said receiving processor;
 c. transmitting a retransmit request when a data message can be handled after a denial message has been sent; and
 d. retransmitting the data message from said transmitting processor to said receiving processor upon receipt of said retransmit request.

6. A method of communicating among processors of a multiprocessor system having a data packet sending processor and a data packet receiving processor, said receiving processor having a receive buffer of limited capacity, comprising the steps of:
 a. transmitting a data packet comprising a plurality of data words and including an end-of-packet indication from said sending processor;
 b. storing data words transmitted by said sending processor in said receive buffer until said receive buffer reaches its capacity;
 c. transmitting an access denial message from said receiving processor to said sending processor if said receive buffer reaches its capacity before said end of packet indication is received by said receiving processor;
 d. transmitting a retransmission request message from said receiving processsor to said sending processor when said receive buffer reaches a level where it can store a data packet;
 e. retransmitting from said sending processor a data packet for which an access denial message was transmitted from said receiving processor; and
 f. storing said retransmitted packet in said receive buffer.

7. The method in accordance with claim 6 wherein said multiprocessor system comprises a plurality of data sending processors and said receiving processor further comprises address storage means, said method further comprising the steps of storing in a sequence the address of each sending processor to which an access denial message has been sent and transmitting a retransmit request to and storing a data packet from each sending processor identified by an address recorded in said address storage means in the sequence in which the address of each sending processor was stored.

8. A multiprocessor system comprising a plurality of processors, a corresponding plurality of bus interface circuits, each of said bus interface circuits connected to an associated processor, and a multiple conductor communication bus interconnecting said bus interface circuits for transferring origination and destination address information and data and control messages among said interface circuits;
 a first plurality of said bus interface circuits each comprising a send buffer for storing data and responsive to send control signals to transfer data to said bus, means for storing an origination and a destination address and responsive to said send control signals to transfer stored origination and destination addresses to said bus, and control means for generating said send control signals; and
 at least one of said plurality of bus interface circuits comprising a receive buffer for storing data and for generating a first receive buffer load status indicator signal and a second receive buffer load status indicator signal, means responsive to destination address information occurring on said bus to transfer data from said bus to said receive buffer, address buffer means for storing address information and for generating address buffer load status indicator signals, and control means responsive to said first receive buffer load status indicator signal to store origination address information occurring on said bus in said address buffer means and responsive to said second receive buffer load status indicator signal and said address buffer load status indicator signals to retrieve address information from said address buffer means and to transmit address information retrieved from said address buffer means on said bus as destination address information together with a retransmit request message;
 said control means of said first plurality of interface circuits being responsive to said retransmit request message and destination address information occurring on said bus to generate said send control signals to transmit on said bus.

9. In a multiprocessor system of claim 8 further comprising bus priority allocator means and wherein each of said interface circuits is assigned a unique predetermined priority and said control means in said at least one bus interface circuit seizes said bus and transmits said address information retrieved from said address buffer means on said bus only when said at least one interface unit is granted bus access by said allocator means.

10. The system in accordance with claim 9 wherein said control means of said first plurality of interface circuits is responsive to said retransmit request message and said destination address information to transmit data on said bus.

11. The multiprocessor system of claim 8 wherein said address buffer means comprises a plurality of locations and said at least one interface circuit comprises means for recognizing predetermined destination address information and for generating a match signal when said predetermined address information occurs on said bus, and wherein said control means in said at least one interface circuit is responsive to said first receive buffer load status indicator signal to enter originating address information occurring on said bus in said address buffer means each time said match signal is generated.

12. In a multiprocessor system comprising a plurality of processors and bus means for transferring data messages between said processors, an arrangement for assuring access from a data transmitting processor to a data receiving processor comprising:
- means for transmitting an access denial signal when said receiving processor cannot accept a data message from a transmitting processor;
- recording means for recording in a sequence identity information of each data transmitting processor to which an access denial signal has been transmitted; and
- means for transmitting a retransmission request signal to each processor for which identity information is recorded in said recording means in the sequence in which the identity information was recorded in said recording means.

13. In a multiprocessor system comprising a plurality of processors each having a unique address identity and bus means interconnecting said processors, an arrangement for assuring access to a receiving processor from a plurality of data transmitting processors making attempts to transfer data messages to said data receiving processor in a sequence, comprising:
- recording means for recording the address identity of data transmitting processors from which said receiving processor cannot accept a data message, in the sequence in which data message transfer attempts are made;
- means for transmitting a retransmission request signal to each of the processors identified by an address identity recorded in said recording means, in the sequence in which address identities were stored in said recording means; and
- means in each of said transmitting processors responsive to said retransmission request signal retransmit a data message;
- whereby access to a receiving processor is assured to a plurality of transmitting processors and is provided in the sequence in which message transfer attempts to said receiving processor were made.

* * * * *